US012632754B2

(12) United States Patent
Huang et al.

(10) Patent No.: US 12,632,754 B2
(45) Date of Patent: May 19, 2026

(54) REMOTE SENSING IMAGE FEATURE DISCRETIZATION METHOD BASED ON ROUGH-FUZZY MODEL

(71) Applicant: HAINAN UNIVERSITY, Haikou (CN)

(72) Inventors: Mengxing Huang, Haikou (CN); Qiong Chen, Haikou (CN); Siling Feng, Haikou (CN); Wenlong Feng, Haikou (CN); Yu Zhang, Haikou (CN); Di Wu, Haikou (CN)

(73) Assignee: HAINAN UNIVERSITY, Hainan (CN)

( * ) Notice: Subject to any disclaimer, the term of this patent is extended or adjusted under 35 U.S.C. 154(b) by 1223 days.

(21) Appl. No.: 17/594,069

(22) PCT Filed: Jun. 30, 2021

(86) PCT No.: PCT/CN2021/103353
§ 371 (c)(1),
(2) Date: Oct. 1, 2021

(87) PCT Pub. No.: WO2022/127075
PCT Pub. Date: Jun. 23, 2022

(65) Prior Publication Data
US 2022/0398478 A1      Dec. 15, 2022

(30) Foreign Application Priority Data

Dec. 15, 2020    (CN) .......................... 202011468816.9

(51) Int. Cl.
*G06N 7/02*       (2006.01)
*G06F 18/21*      (2023.01)
(Continued)

(52) U.S. Cl.
CPC ........... *G06N 7/023* (2013.01); *G06F 18/217* (2023.01); *G06F 18/24* (2023.01);
(Continued)

(58) Field of Classification Search
CPC .......... G06N 7/02; G06N 7/023; G06N 7/026; G06N 3/04; G06N 3/08; G06N 3/126;
(Continued)

(56) References Cited

U.S. PATENT DOCUMENTS 6,665,438 B1 * 12/2003 Lin ..................... G06F 18/2134
382/260
9,824,489 B2 * 11/2017 Khormi .................. G06T 17/05
(Continued)

FOREIGN PATENT DOCUMENTS

CN        102426697 B  *  8/2013  ............... G06T 5/00
CN        107346549 A  *  11/2017  ............... G06T 7/33
(Continued)

OTHER PUBLICATIONS

Yu, XianChuan, et al. "Land cover classification of remote sensing imagery based on interval-valued data fuzzy c-means algorithm." Science China Earth Sciences 57 (2014): 1306-1313. (Year: 2014).*
(Continued)

*Primary Examiner* — Sumati Lefkowitz
*Assistant Examiner* — Ryan P Potts
(74) *Attorney, Agent, or Firm* — WELSH FLAXMAN & GITLER LLC

(57)        ABSTRACT
Provided is a remote sensing image feature discretization method based on rough-fuzzy model, comprising the following steps: listing the digital number in each band and category of a selected sample in remote sensing images, and building an image information decision table based on the digital number and category; initializing the class center of each category and the membership degree of a sample example relative to the class center; updating the class center of each category and the membership degree of the sample example relative to the class center iteratively, and obtaining the final value of the class center of each category and the
(Continued)

Features extraction (a) Original image (b) Classification effect map final value of the membership degree; building a rough-fuzzy set, computing the mean approximation accuracy of the rough-fuzzy set, discretizing the image information decision table, evaluating the discretization results based on the mean approximation accuracy and a genetic algorithm, and selecting an optimal discretization solution.

3 Claims, 3 Drawing Sheets
(2 of 3 Drawing Sheet(s) Filed in Color)

(51) Int. Cl.

| | |
|---|---|
| *G06F 18/24* | (2023.01) |
| *G06F 18/2413* | (2023.01) |
| *G06N 3/08* | (2023.01) |
| *G06N 3/126* | (2023.01) |
| *G06V 20/10* | (2022.01) |
| *G06V 20/13* | (2022.01) |

(52) U.S. Cl.
CPC ......... *G06F 18/24137* (2023.01); *G06N 3/08* (2013.01); *G06N 3/126* (2013.01); *G06V 20/13* (2022.01); *G06V 20/194* (2022.01)

(58) Field of Classification Search
CPC .. G06N 5/04; G01N 2021/1793; Y02A 90/10; Y02A 10/40; G06V 20/13; G06V 20/188; G06V 20/10; G06V 20/176; G06V 20/52; G06V 10/143; G06V 10/776; G06V 10/70; G06V 10/26; G06V 10/762; G06V 10/764; G06V 10/58; G06V 20/194; G01W 1/10; G06F 18/24; G06F 18/2111; G06F 18/23213; G06F 18/217; G06F 18/24137; G06T 2207/20084; G06T 2207/10032; G06T 2207/10036; G06T 2207/30181; G06T 2207/30188; G06Q 50/02; G01C 11/06
See application file for complete search history.

(56) References Cited

U.S. PATENT DOCUMENTS

| | | | | | |
|---|---|---|---|---|---|
| 2015/0356350 | A1* | 12/2015 | Awad | .................. | G06V 10/771 |
| | | | | | 382/199 |
| 2018/0132422 | A1* | 5/2018 | Hassanzadeh | ......... | G06Q 50/02 |

FOREIGN PATENT DOCUMENTS

| | | | | | | |
|---|---|---|---|---|---|---|
| CN | 107909062 | A | * | 4/2018 | .............. | G06K 9/00 |
| CN | 109872331 | A | * | 6/2019 | .............. | G06T 7/11 |
| CN | 111553413 | A | * | 8/2020 | .............. | G06K 9/62 |
| TW | I599896 | B | * | 9/2017 | ............. | G06F 17/10 |

OTHER PUBLICATIONS

Huang, Mengxing, Qiong Chen, and Hao Wang. "A multivariable optical remote sensing image feature discretization method applied to marine vessel targets recognition." Aug. 28, 2019, Multimedia Tools and Applications 79.7 (2020): 4597-4618. (Year: 2019).*

Chen, Qiong, and Mengxing Huang. "Rough fuzzy model based feature discretization in intelligent data preprocess." Jan. 18, 2021, Journal of Cloud Computing 10.1 (2021): 5. (Year: 2021).*

Chen, Qiong, et al. "Reinforcement Learning-Based Genetic Algorithm in Optimizing Multidimensional Data Discretization Scheme." Mar. 30, 2020, Mathematical Problems in Engineering 2020.1 (2020): 1698323. (Year: 2020).*

Schaefer, Gerald. "Soft computing-based colour quantisation." EURASIP Journal on Image and Video Processing 2014 (2014): 1-9. (Year: 2014).*

Yu, Jie, et al. "Remote sensing image classification based on improved fuzzy c-means." Geo-spatial Information Science 11.2 (2008): 90-94. (Year: 2008).*

Bezdek, James C., Robert Ehrlich, and William Full. "FCM: The fuzzy c-means clustering algorithm." Computers & geosciences 10.2-3 (1984): 191-203. (Year: 1984).*

* cited by examiner

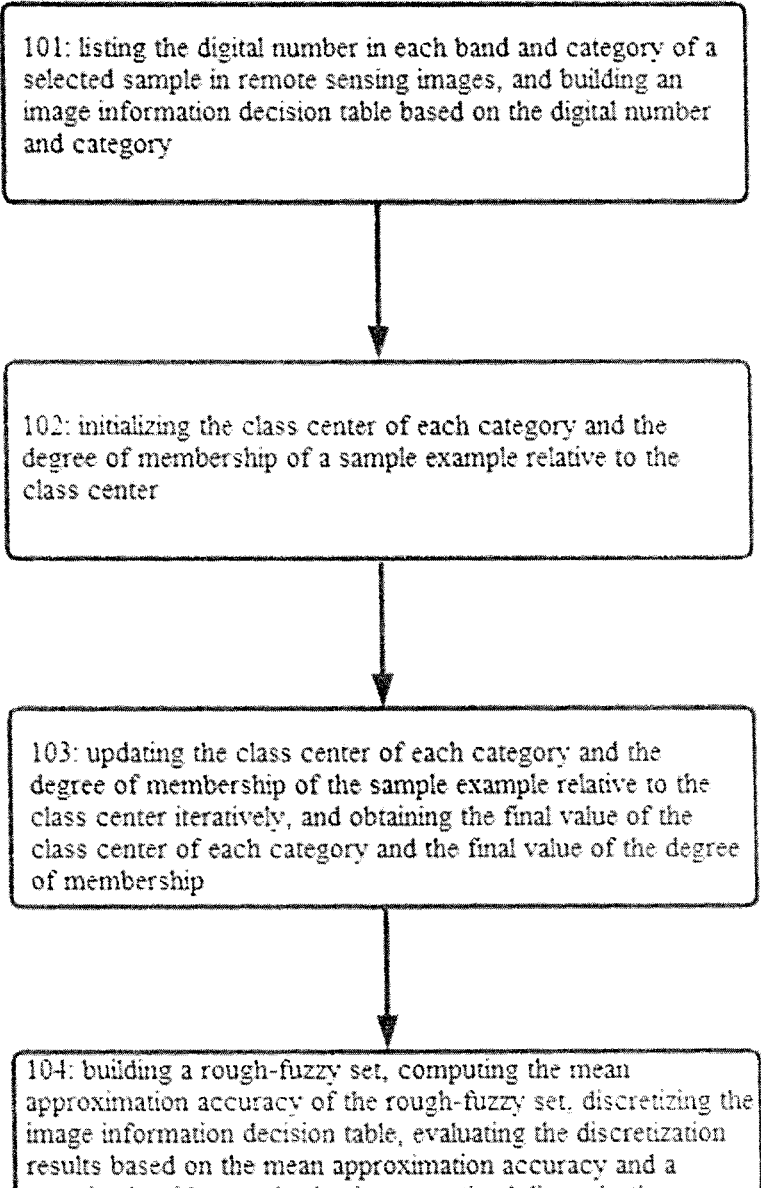

101: listing the digital number in each band and category of a selected sample in remote sensing images, and building an image information decision table based on the digital number and category 102: initializing the class center of each category and the degree of membership of a sample example relative to the class center 103: updating the class center of each category and the degree of membership of the sample example relative to the class center iteratively, and obtaining the final value of the class center of each category and the final value of the degree of membership 104: building a rough-fuzzy set, computing the mean approximation accuracy of the rough-fuzzy set, discretizing the image information decision table, evaluating the discretization results based on the mean approximation accuracy and a genetic algorithm, and selecting an optimal discretization solution

FIG.1

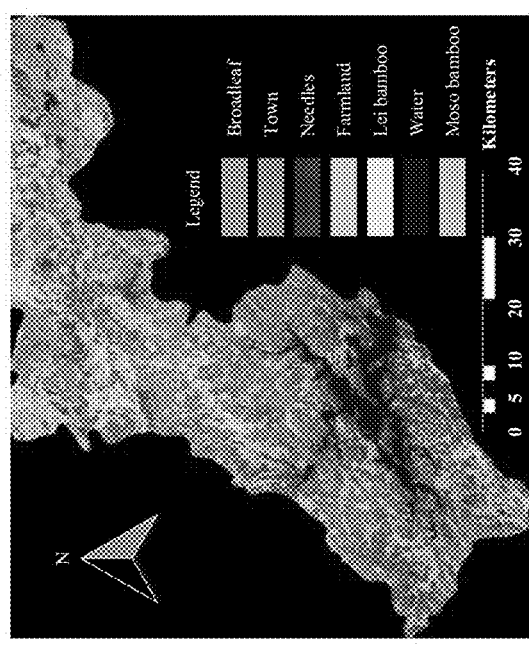
(b) Classification effect map
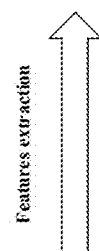
Features extraction
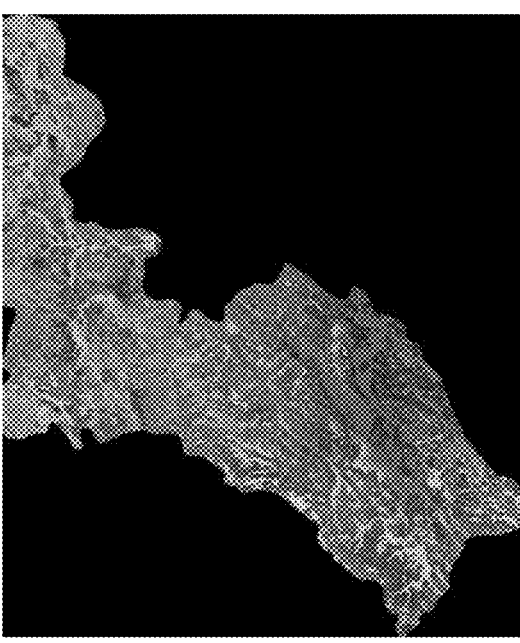
(a) Original image
FIG. 2

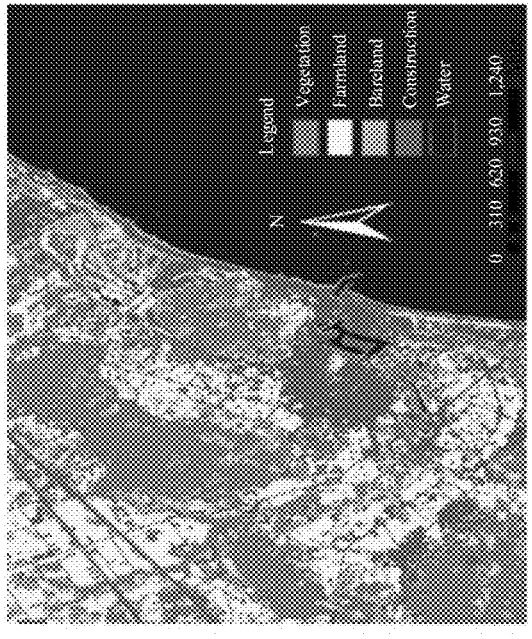
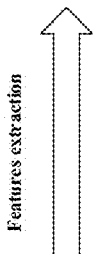
Features extraction
(b) Classification effect map
FIG. 3
(a) Original image

REMOTE SENSING IMAGE FEATURE DISCRETIZATION METHOD BASED ON ROUGH-FUZZY MODEL

TECHNICAL FIELD OF THE INVENTION

The present invention relates to the field of remote sensing image feature extraction technology, in particular to a remote sensing image feature discretization method based on a rough-fuzzy model.

BACKGROUND OF THE INVENTION

Feature discretization is an important massive data pre-processing technology in industrial control. It improves an efficiency of edge cloud computing by transforming continuous features into discrete features, thus meeting the requirement for high-quality cloud service. Compared with other discretization methods, the discretization method based on a rough set has achieved good results in many applications because it can make full use of the known knowledge bases without any priori information. However, the equivalence class of the rough set is a common set, which has difficulty in describing fuzzy components inside the data, and the obtained accuracy is low on some problems of complex data types in the big data environment.

SUMMARY OF THE INVENTION

The purpose of the present invention is to provide the remote sensing image feature discretization method based on the rough-fuzzy model to solve the problems raised in the background.

The present invention is realized by the following technical solution: the remote sensing image feature discretization method based on the rough-fuzzy model, comprising the following steps:

listing the digital number in each band and category of a selected sample in the remote sensing images, and building an image information decision table based on the digital number and category;

initializing a class center of each category and a membership degree of a sample example relative to the class center;

updating the class center of each category and the membership degree of the sample example relative to the class center iteratively, and obtaining a final value of the class center of each category and a final value of the membership degree;

building a rough-fuzzy set, computing a mean approximation accuracy of the rough-fuzzy set, discretizing the image information decision table, evaluating discretization results based on the mean approximation accuracy and a genetic algorithm, and selecting an optimal discretization solution.

Preferably, building the image information decision table based on the digital number and the category, comprising:

selecting a plurality of samples from the remote sensing images;

obtaining the digital number in each band of each selected sample by an image sampling, and labeling a corresponding land cover type in each sample, wherein all the samples constitute a sample set;

building a decision table matrix with the band as a condition attribute and with the surface feature type as a decision attribute according to the sample set with the digital numbers and land type labels.

Preferably, initializing the class center of each category and the membership degree of the sample example relative to the class center, comprising:

initializing the class center $$c_j^0$$

of each category as:

$$PM^0 = \begin{bmatrix} f_1(x_1) & f_1(x_2) & \dots & f_1(x_N) \\ f_2(x_1) & f_2(x_2) & \dots & f_2(x_N) \\ \cdot & \cdot & \dots & \cdot \\ \cdot & \cdot & \dots & \cdot \\ \cdot & \cdot & \dots & \cdot \\ f_C(x_1) & f_C(x_2) & \dots & f_C(x_N) \end{bmatrix}$$

$$f_j(x_i) = \begin{cases} 1, & x_i \text{ belongs to class } j \\ 0, & \text{otherwise} \end{cases}$$

where $1 \le i \le N$ and $1 \le j \le C$ wherein N is the number of samples, and C is the number of categories;

initializing the membership degree of the sample example relative to the class center as:

$$u_{ij}^0 = 1 / \sum_{k=1}^{C} \left( \frac{\sum_{h=1}^{M} (x_{ih} - c_{jh})^2}{\sum_{h=1}^{M} (x_{ih} - c_{kh})^2} \right)$$

wherein M is the number of attributes, $x_{ih}$ is a value of the sample $x_i$ on the h th attribute, and $c_{jh}$ is a value of the current class center $c_j$ on the h th attribute.

Preferably, updating the class center of each category and the membership degree of the sample example relative to the class center iteratively, comprising:

updating the class center $$c_j^0$$

iteratively by the following formula:

$$c_j^1 = \sum_{i=1}^{N} ((u_{ij}^0)^2 \times x_i) / \sum_{i=1}^{N} (u_{ij}^0)^2$$

wherein $$c_j^1$$

is an updated class center;

computing the new membership degree $$u_{ij}^1$$

iteratively according to the updated class center $$c_j^1.$$

Preferably, stopping iterative computations of $u_{ij}$ and $c_j$ and obtaining the final value of the class center of each category and the final value of the membership degree when the following conditions are met:

$$\max_{ij}\left\{\left|u_{ij}^{t+1} - u_{ij}^t\right|\right\} < \varepsilon$$

wherein t is the number of iterations, and $\varepsilon$ is an error threshold.

Preferably, building the rough-fuzzy set, and computing the mean approximation accuracy of the rough-fuzzy set, comprising:

creating a rough-fuzzy set based on each category:

$$A_j(x_i){=}u_{ij},1{\leq}i{\leq}N,1{\leq}j{\leq}C.$$

computing a lower approximation of the rough-fuzzy set:

$$R\_A_j(x_i) = \inf_{y \in U}\{A_j(y) \mid (x_i, y) \in R\}$$

computing an upper approximation of the rough-fuzzy set:

$$R^-A_j(x_i) = \sup_{y \in U}\{A_j(y) \mid (x_i, y) \in R\}$$

computing the mean approximation accuracy of the rough-fuzzy set:

$$\bar{\eta} = \frac{1}{C}\sum_{j=1}^{C}\frac{|R\_A_j|}{|R^-A_j|}.$$

Preferably, discretizing the image information decision table, comprising:

sorting and deduplicating in the band, according to brightness values, all digital numbers contained in each band in the image information decision table, and obtaining initial breakpoints of all bands, wherein the initial breakpoints constitute a candidate breakpoint set of the remote sensing images, and each subset of the candidate breakpoint set corresponds to a discretization solution of the remote sensing images.

Preferably, evaluating the discretization results based on the mean approximation accuracy and the genetic algorithm, and selecting the optimal discretization solution, comprising:

building a fitness function based on the mean approximation accuracy and the number of breakpoints:

$$Fit{=}\alpha{\times}|D|{+}\beta{\times}\bar{\eta}$$

where $\alpha{\geq}0$, $\beta{\geq}0$, and $\alpha{+}\beta{=}1$ wherein $|D|$ is the number of breakpoints of the discretization solution D, and both $\alpha$ and $\beta$ are weight coefficients;

taking a discretization solution as an individual of a group in the genetic algorithm, computing the fitness values of all the individuals in the group iteratively based on the fitness function, and finding an individual with the greatest fitness value, wherein the discretization solution corresponding to the individual with the greatest fitness value is the optimal discretization solution.

Compared with the prior art, the present invention has the beneficial effects as follows:

According to the remote sensing image feature discretization method based on the rough-fuzzy model provided by the present invention, continuous features in spectral information can be transformed into discrete features closer to the representation of a knowledge layer after the remote sensing images are processed by feature discretization based on the rough-fuzzy model, thus greatly cutting down a data size, reducing system overhead, lightening system loads, removing redundant information, reducing a data inconsistency, enhancing a robustness and a generalization capability of learning algorithms, and improving a classification accuracy of the remote sensing images.

BRIEF DESCRIPTION OF THE DRAWINGS

The patent or application filed contains at least one drawing executed in color. Copies of this patent or patent application publication with color drawing(s) will be provided by the Office upon request and payment of the necessary fees.

In order to give a clearer description of the technical solutions in the embodiments of the present invention, the drawings to be used in the description of the embodiment will be briefly introduced below. Obviously, the drawings in the following description are only preferred embodiments of the present invention, and other drawings can also be obtained according to these drawings without contributing creative effort for those of ordinary skill in the art.

FIG. 1 is a flow chart of the remote sensing image feature discretization method based on the rough-fuzzy model provided in the present invention;

FIG. 2 is a classification effect map of the Landsat 8 image provided in the embodiment of the present invention; and FIG. 3 is a classification effect map of the GF-2 image provided in the embodiment of the present invention.

DETAILED DESCRIPTION OF EMBODIMENTS

The technical solutions in the embodiments of the present invention will be clearly and completely described below in combination with the drawings in the embodiments of the present invention. Obviously, the described embodiments are only part of the embodiments of the present invention, not all of them. Generally, the components of the embodiments of the present invention described and shown in the drawings herein can be arranged and designed in various configurations. Therefore, the following detailed description of the embodiments of the present invention provided in the drawings is not intended to limit the scope of the present invention requested, but only represents selected embodiments of the present invention. Based on the embodiments of the present invention, all other embodiments obtained by those skilled in the art without contributing their creative effort shall be included in the protection scope of the present invention.

Refer to FIG. 1, the remote sensing image feature discretization method based on the rough-fuzzy model, comprising the following steps:

Step 101: listing the digital number in each band and category of the selected sample in the remote sensing images, and building the image information decision table based on the digital number and category;

listing the digital number in each band and category of the selected sample in the remote sensing images through processes of a radiometric calibration, an atmospheric correction, and a sampling of the remote sensing images, and building the image information decision table based on the digital number and category.

Specifically, this step can be implemented in the following ways:

selecting several regions with significant features from the remote sensing images discrete training data sets for discretization, separating band attributes from the training data sets, and labeling each region respectively. Here, the methods of extracting information from the remote sensing images and separating various information such as geographical coordinate information and band attributes can be realized by the prior art, which are not improved in this discretization method, so it is simplified and not described in detail here.

selecting a plurality of the samples by image sampling; obtaining the digital number of each selected sample and labeling the corresponding land cover type in each sample, wherein all the samples constitute the sample set. For example, assigning values to the samples in the regions in a category attribute column according to a region labeling; next, picking out the band attributes and category attributes of the samples from a variety of information obtained after separation from the training data sets (discarding other information), merging the band attributes and category attributes in order to build the decision table matrix; finally, sorting the samples according to the values in the category attribute column, and generating the sample set with digital numbers and land type labels.

building the decision table matrix with the band as the condition attribute and the surface feature type as the decision attribute according to the sample set with digital numbers and land type labels, and the matrix style is shown below: S=(U, R,V, f), wherein U is a non-null limited universe of discourse, R is an attribute set, V' is a value domain, f is a mapping function of an object to each attribute value domain.

Step 102: initializing the class center of each category and the membership degree of the sample example relative to the class center;

assuming that the number of samples contained in U is N, the number of categories is C, the number of attributes is M, $x_{ih}$ is the value of sample $x_i$ on the hth attribute, $1 \leq i \leq N$, $1 \leq h \leq M$;

based on the samples contained in U, building an initial fuzzy segmentation matrix as:

$$PM^0 = \begin{bmatrix} f_1(x_1) & f_1(x_2) & \dots & f_1(x_N) \\ f_2(x_1) & f_2(x_2) & \dots & f_2(x_N) \\ . & . & \dots & . \\ . & . & \dots & . \\ . & . & \dots & . \\ f_C(x_1) & f_C(x_2) & \dots & f_C(x_N) \end{bmatrix}$$

wherein, $$f_j(x_i) = \begin{cases} 1, & x_i \text{ belongs to class } j \\ 0, & \text{otherwise} \end{cases}$$

where $1 \leq i \leq N$ and $1 \leq j \leq C$ regarding the initial fuzzy partition matrix as an initialized class center of each category;

based on the initialized class center, initializing the membership degree of the sample example relative to the class center as:

$$u_{ij}^0 = 1 / \sum\nolimits_{k=1}^{C} \left( \frac{\sum_{h=1}^{M} (x_{ih} - c_{jh})^2}{\sum_{h=1}^{M} = (x_{ih} - c_{kh})^2} \right)$$

wherein M is the number of attributes, $x_{ih}$ is the value of the sample $x_i$ on the h th attribute, and $c_{jh}$ is the value of the current class center $c_j$ on the h the attribute.

Step 103: updating the class center of each category and the membership degree of the sample example relative to the class center iteratively, and obtaining the final value of the class center of each category and the final value of the membership degree, specifically comprising:

updating the class center $$c_j^0$$

iteratively by the following formula:

$$c_j^1 = \sum\nolimits_{i=1}^{N} \left( (u_{ij}^0)^2 \times x_i \right) / \sum\nolimits_{i=1}^{N} (u_{ij}^0)^2$$

wherein $$c_j^1$$

is the updated class center;

computing the new membership degree $$u_{ij}^1$$

iteratively according to the updated class center $$c_j^1.$$

stopping the iterative computations of $u_{ij}$ and $c_j$ and obtaining the final value of the class center of each category and the final value of the membership degree when the following conditions are met:

$$\max_{ij}\{|u_{ij}^{t+1} - u_{ij}^t|\} < \varepsilon$$

wherein t is the number of iterations, $\varepsilon$ is the error threshold.

Step 104: building the rough-fuzzy set, computing the mean approximation accuracy of the rough-fuzzy set, discretizing the image information decision table, evaluating the discretization results based on the mean approximation accuracy and the genetic algorithm, and selecting the optimal discretization solution.

The detailed process comprises:

creating a rough-fuzzy set for each category based on the obtained final value of the membership degree:

$$A_j(x_i)=u_{ij}, 1 \leq i \leq N, 1 \leq j \leq C;$$

computing the lower approximation of the rough-fuzzy set:

$$R\_A_j(x_i) = \inf_{y \in U}\{A_j(y) \mid (x_i, y) \in R\}$$

computing the upper approximation of the rough-fuzzy set:

$$R^-A_j(x_i) = \sup_{y \in U}\{A_j(y) \mid (x_i, y) \in R\}$$

computing the mean approximation accuracy of the rough-fuzzy set:

$$\bar{\eta} = \frac{1}{C}\sum_{j=1}^{C}\frac{|R\_A_j|}{|R^-A_j|}.$$

Discretization means dividing the continuous features (also known as continuous attributes) into a finite number of subintervals by a specific method and associating these subintervals with a set of discrete values (also known as the breakpoints); the discretization can greatly cut down the data size, thus improving a massive data processing efficiency of the edge cloud computing at an edge end, and greatly relieving a pressure of transmitting data back to a central cloud.

Therefore, in this embodiment, the image information decision table is discretized, comprising:

sorting and deduplicating in the band, according to brightness values, all digital numbers contained in each band in the image information decision table and obtaining the initial number of the breakpoints of several bands, wherein the initial number of the breakpoints is the initial discretization solution.

evaluating the discretization results based on the mean approximation accuracy and the genetic algorithm, and selecting the optimal discretization solution, comprising:

building the fitness function based on the mean approximation accuracy and the number of the breakpoints:

$$Fit=\alpha \times |D|+\beta \times \bar{\eta}$$

where $\alpha \geq 0$, $\beta \geq 0$, and $\alpha + \beta = 1$ wherein $|D|$ is the number of the breakpoints of the discretization solution D;

wherein $\alpha$ and $\beta$ are the weight coefficients. The selection of weight coefficients is an open question, for no given weight coefficient can adapt to all data sets, and a rationality of weight setting is generally judged by characteristics of data sets and experimental observations; the classification accuracy is directly related to the mean approximation accuracy of the rough-fuzzy sets in this embodiment, and therefore, in this embodiment, $\alpha=0.1$, and $\beta=0.9$.

The genetic algorithm is a globally optimized probabilistic evolutionary algorithm, which has achieved good performance on many optimization problems. The genetic algorithm evaluates the quality of individuals in the group through the fitness function and transforms a problem-solving process into a process similar to the crossover and mutation of chromogenes in biological evolution. Usually, the genetic algorithm can obtain better optimization results quickly than some conventional optimization algorithms when complex combinational optimization problems are being solved. However, the genetic algorithm cannot directly deal with parameters of a problem space, thus the problem to be solved must be expressed as a chromosome or individual of a genetic space by encoding. This transformation operation is called genetic encoding. The genetic encoding adopts the following specifications: (1) completeness: all candidate solutions in the problem space can be represented as the chromosomes in the genetic space; (2) soundness: the chromosomes in the genetic space can correspond to all the candidate solutions in the problem space; (3) non-redundancy: there is a one-to-one correspondence between the chromosomes and the candidate solutions.

The discretization problem can be regarded as the selection of candidate breakpoints. Each chromosome in the group represents a possible discretization solution. The chromosome length is equal to the number of candidate breakpoints. We encode the candidate breakpoints in the way of binary encoding. Each bit in a binary code corresponds to a candidate breakpoint, and the values '1' and '0' represent breakpoint selected and breakpoint unselected respectively. A set of selected candidate breakpoints is a possible discretization solution.

In this embodiment, a plurality of discretization solutions is regarded as group individuals in the genetic algorithm; the individuals with the maximum fitness value are iteratively computed and looked for through the evolution function of the genetic algorithm, and the discretization solution corresponding to the individual with the maximum fitness value is the optimal discretization solution.

Meanwhile, when the number of iterations satisfies the requirement, the discretization solution corresponding to the number of iterations is the optimal discretization solution.

When the method of the present invention is verified through experiments, the test data sets used in the experiments are Landsat 8 satellite images from the southeast region in China and the GF-2 images from South China Sea Islands.

The Landsat 8 satellite data contain 7 bands, and GF-2 satellite data contain 4 bands; the surface features on the Landsat 8 image in the experiments are divided into seven categories, i.e., broadleaf, town, conifer, farmland, *Phyllostachys praecox*, water, and moso bamboo; the surface features on the GF-2 image are divided into five categories, i.e., construction land, bareland, farmland, vegetation, and water.

Several regions covering the seven categories are randomly selected from the Landsat 8 image and labeled, integrated and used as training samples to be discretized, and there are a total of 2621 examples. Among them, there are 308 broadleaf examples, 245 town examples, 322 conifer examples, 675 farmland examples, 296 *Phyllostachys praecox* examples, 262 water examples, and 513 moso bamboo examples.

Another group of samples of the same number as the training samples is used as a test set. Among them, there are 308 broadleaf examples, 245 town examples, 322 conifer examples, 675 farmland examples, 296 *Phyllostachys praecox* examples, 262 water examples, and 513 moso bamboo examples.

All the digital numbers contained in each band are sorted and deduplicated in the band according to the brightness values, so that the initial numbers of the breakpoints of seven bands are obtained, which are 1314, 1517, 1056, 1211, 1086, 1920 and 1832, with 9936 breakpoints in total.

Similarly, in the GF-2 image, there are a total of 7554 examples for the training samples to be discretized. Among them, there are 2094 construction land examples, 775 bareland examples, 1478 farmland examples, 2251 vegetation examples, and 956 water examples. We take another group of samples of the same number as the training samples as the test set. Among them, there are 2094 construction land examples, 775 bareland examples, 1478 farmland examples, 2251 vegetation examples, and 956 water examples.

All the digital numbers contained in each band are sorted and deduplicated in the band according to the brightness values respectively, so that the initial numbers of breakpoints of four bands are obtained, which are 3685, 3769, 2535 and 757 respectively, with 10746 breakpoints in total. In a methylation data set, there are a total of 3709 examples for the training samples to be discretized. Among them, there are 1290 examples of 6 mA methylation, and 2419 examples of 4 mC methylation. There are a total of 1500 examples for the test samples. Among them, there are 500 examples of 6 mA methylation and 1000 examples of 4 mC methylation.

All values contained in each attribute of the first group of methylation training set are sorted and deduplicated in the attribute respectively, so that the initial numbers of the breakpoints of three attributes are obtained, which are 1718, 1748 and 960 respectively, with 4426 breakpoints in total. All values contained in each attribute of the second group of methylation training set are sorted and deduplicated in the attribute respectively, so that the initial numbers of the breakpoints of three attributes are obtained, which are 564, 1748 and 960 respectively, with 3272 breakpoints in total. In a banknote verification data set, there are 1072 examples for the training samples to be discretized. Among them, there are 562 examples of genuine banknote samples and 510 examples of counterfeit banknote samples. There are 300 examples of test samples in total. Among them, there are 200 examples of genuine banknote samples and 100 examples of counterfeit banknote samples. All values contained in each attribute are sorted and deduplicated in the attribute respectively, so that the initial numbers of the breakpoints of four attributes are obtained, which are 1052, 996, 1015 and 940 respectively, with 4003 breakpoints in total.

In order to verify an effectiveness of the proposed algorithm, an RFMD method disclosed in the present invention is compared with the discretization results obtained by an RS-GA method, an EDiRa method, a CVD method and an RLGA method for evaluation mainly in terms of a data consistency and number of intervals.

The numbers of intervals in all bands and the results of data inconsistency obtained by the methods of RFMD, RS-GA, EDiRa, CVD and RLGA on the Landsat 8 image are shown in Table 1 and Table 2.

TABLE 1

| Method | B1 | B2 | B3 | B4 | B5 | B6 | B7 |
|---|---|---|---|---|---|---|---|
| RFMD | 109 | 67 | 58 | 64 | 63 | 55 | 71 |
| RS-GA | 153 | 69 | 56 | 52 | 76 | 103 | 61 |
| EDiRa | 135 | 71 | 86 | 45 | 52 | 58 | 73 |
| CVD | 98 | 73 | 65 | 67 | 72 | 58 | 71 |
| RLGA | 120 | 67 | 65 | 52 | 63 | 55 | 71 |

TABLE 2

| Method | Inconsistencies | Discrete intervals |
|---|---|---|
| RFMD | 0 | 487 |
| RS-GA | 5 | 570 |
| EDiRa | 13 | 520 |
| CVD | 17 | 504 |
| RLGA | 2 | 493 |

It can be seen that the number of intervals obtained by the RFMD algorithm is 487, which is the least among all algorithms, and there is no data error. The number of intervals of the RS-GA algorithm is the largest among all algorithms, which reaches 570, followed by the EDiRa algorithm with the number of intervals of 520, and the numbers of data errors obtained by the two algorithms are 5 and 13 respectively. The number of intervals of the CVD algorithm is only 17 more than that of the RFMD algorithm, but the number of data errors is the largest among all algorithms, which is 17. The number of intervals of the RLGA algorithm is 493 with 2 data errors, and the performance of the RLGA algorithm is second only to the RFMD algorithm.

The numbers of intervals in all bands and the results of data inconsistency obtained by the methods of RFMD, RS-GA, EDiRa, CVD and RIGA on the GF-2 image are shown in Table 3 and Table 4.

TABLE 3

| Method | B1 | B2 | B3 | B4 |
|---|---|---|---|---|
| RFMD | 267 | 458 | 207 | 103 |
| RS-GA | 389 | 502 | 397 | 103 |
| EDiRa | 405 | 517 | 253 | 132 |
| CVD | 299 | 461 | 278 | 115 |
| RLGA | 267 | 461 | 247 | 103 |

TABLE 4

| Method | Inconsistencies | Discrete intervals |
|---|---|---|
| RFMD | 0 | 1035 |
| RS-GA | 14 | 1391 |
| EDiRa | 25 | 1307 |
| CVD | 30 | 1153 |
| RLGA | 7 | 1078 |

It can be seen that the number of intervals obtained by the RFMD algorithm is 1035, which is the least among all the algorithms, and there is no data error. The number of intervals of the RS-GA algorithm is the largest among all the algorithms, which reaches 1391, followed by the EDiRa algorithm with the number of intervals of 1307, and the numbers of data errors obtained by the two algorithms are 14 and 25 respectively. The number of intervals of the CVD algorithm is 118 more than that of the RFMD algorithm, and the number of data errors is the largest among all the algorithms, which is 30. The number of intervals of the RLGA algorithm is 1078 with 7 data errors, and the performance of the RLGA algorithm is second only to the RFMD algorithm.

The numbers of intervals for all attributes and the results of data inconsistency obtained by the methods of RFMD, RS-GA, EDiRa, CVD and RLGA on the first group of methylation data set are shown in Table 5 and Table 6.

TABLE 5

| Method | Mean | Model prediction | Interpulse duration ratio |
|---|---|---|---|
| RFMD | 210 | 189 | 138 |
| RS-GA | 244 | 269 | 156 |
| EDiRa | 241 | 296 | 34 |
| CVD | 205 | 229 | 129 |
| RLGA | 225 | 260 | 71 |

TABLE 6

| Method | Inconsistencies | Discrete intervals |
|---|---|---|
| RFMD | 12 | 537 |
| RS-GA | 80 | 669 |
| EDiRa | 113 | 571 |
| CVD | 259 | 563 |
| RLGA | 71 | 556 |

It can be seen that the number of intervals obtained by the RFMD algorithm is 537, which is the least among all algorithms, and the number of data errors is also the least among all algorithms, which is 12. The number of intervals of the RS-GA algorithm is the largest among all algorithms, which reaches 669, followed by the EDiRa algorithm with the number of intervals of 571, and the numbers of data errors obtained by the two algorithms are 80 and 113 respectively. The number of intervals of the CVD algorithm is 26 more than that of the RFMD algorithm, and the number of data errors is the largest among all algorithms, which is 259. The number of intervals of the RLGA algorithm is 556 with 71 data errors, and the performance of the RLGA algorithm is second only to the RFMD algorithm.

The numbers of intervals for all attributes and the results of data inconsistency obtained by the methods of RFMD, RS-GA, EDiRa, CVD and RLGA on the second group of methylation data set are shown in Table 7 and Table 8.

TABLE 7

| Method | Error | Model prediction | Interpulse duration ratio |
|---|---|---|---|
| RFMD | 141 | 332 | 242 |
| RS-GA | 180 | 448 | 243 |
| EDiRa | 148 | 415 | 219 |
| CVD | 150 | 373 | 228 |
| RLGA | 143 | 363 | 216 |

TABLE 8

| Method | Inconsistencies | Discrete intervals |
|---|---|---|
| RFMD | 0 | 715 |
| RS-GA | 6 | 871 |
| EDiRa | 11 | 782 |
| CVD | 15 | 751 |
| RLGA | 3 | 722 |

It can be seen that the number of intervals obtained by the RFMD algorithm is 715, which is the least among all algorithms, and there is no data error. The number of intervals of the RS-GA algorithm is the largest among all algorithms, which reaches 871, followed by the EDiRa algorithm with the number of intervals of 782, and the numbers of data errors obtained by the two algorithms are 6 and 11 respectively. The number of intervals of the CVD algorithm is 36 more than that of the RFMD algorithm, and the number of data errors is the largest among all algorithms, which is 15. The number of intervals of the RLGA algorithm is 722 with 3 data errors, and the performance of the RLGA algorithm is second only to the RFMD algorithm.

The numbers of intervals for all attributes and the results of data inconsistency obtained by the methods of RFMD, RS-GA, EDiRa, CVD and RIGA on the banknote verification data set are shown in Table 9 and Table 10.

TABLE 9

| Method | Variance | Skewness | Kurtosis | Entropy |
|---|---|---|---|---|
| RFMD | 6 | 7 | 7 | 7 |
| RS-GA | 11 | 11 | 13 | 4 |
| EDiRa | 14 | 8 | 12 | 3 |
| CVD | 10 | 10 | 12 | 3 |
| RLGA | 6 | 8 | 8 | 8 |

TABLE 10

| Method | Inconsistencies | Discrete intervals |
|---|---|---|
| RFMD | 0 | 27 |
| RS-GA | 1 | 39 |
| EDiRa | 2 | 37 |
| CVD | 3 | 35 |
| RLGA | 0 | 30 |

It can be seen that the number of intervals obtained by the RFMD algorithm is 27, which is the least among all algorithms, and there is no data error. The number of intervals of the RS-GA algorithm is the largest among all algorithms, which reaches 39, followed by the EDiRa algorithm with the number of intervals of 37, and the numbers of data errors obtained by the two algorithms are 1 and 2 respectively. The number of intervals of the CVD algorithm is 8 more than that of the RFMD algorithm, and the number of data errors is the largest among all algorithms, which is 3. The number of intervals of the RLGA algorithm is 30 with no data error, and the performance of the RLGA algorithm is second only to the RFMD algorithm.

Although discretization criteria used by the EDiRa and the CVD have certain rationality, the relatively fixed division criteria cannot comprehensively measure the discrete intervals. In addition, both the EDiRa and the CVD need the distribution information of sample attribute values in the data set to improve an accuracy of interval division. Since the discretization criteria based on the rough set are used, good results can also be achieved by RS-GA without any prior information.

The performance of RS-GA is often poor in complex types of data sets due to a lack of the ability to describe fuzzy components in data. RLGA introduces reinforcement learning mechanisms into crossover and mutation operations respectively to improve a search efficiency of the genetic algorithm and keeps looking for a solution with the least number of intervals while controlling the data errors at a low level. Like RS-GA, the fitness function used by RLGA is only based on the rough set, and RLGA lacks the ability to describe fuzzy components in data.

RFMD combines the advantages of the rough set and the fuzzy set, fully takes account of a correlation between fuzziness and attributes within the data and determines the breakpoints in a plurality of continuous variables by evolutionary search. In this way, the performance of RFMD is greatly improved, so that RFMD can adapt to a majority of complex data sets. Therefore, the discretization result obtained by RFMD is the best of the five algorithms. The key differences between them are shown in Table 11.

TABLE 11

| Method | Direction | Attributes | Prior-knowledge | Uncertainty |
|---|---|---|---|---|
| RFMD | Evolutionary search | Multivariate | No need | Incompleteness & Fuzziness |
| RS-GA | Evolutionary search | Multivariate | No need | Incompleteness |
| EDiRa | Top-Down | Univariate | Need | Incompleteness |
| CVD | Bottom-Up | Univariate | Need | Incompleteness |
| RLGA | Evolutionary search | Multivariate | No need | Incompleteness |

Neural network classifiers are trained respectively for discretized samples of these five algorithms, so that the classification results of the Landsat 8 image and the GF-2 image are obtained, as shown in Table 12 and Table 13

TABLE 12

| Method | Overall accuracy | Kappa coefficient |
|---|---|---|
| RFMD | 0.9428 | 0.9314 |
| RS-GA | 0.9275 | 0.9131 |
| EDiRa | 0.9222 | 0.9067 |
| CVD | 0.8993 | 0.8793 |
| RLGA | 0.9351 | 0.9223 |

TABLE 13

| Method | Overall accuracy | Kappa coefficient |
|---|---|---|
| RFMD | 0.9734 | 0.9655 |
| RS-GA | 0.9297 | 0.9083 |
| EDiRa | 0.9076 | 0.8795 |
| CVD | 0.8752 | 0.8385 |
| RLGA | 0.9314 | 0.9106 |

It can be seen that the classification accuracy of the method disclosed in the present invention has the best performance among the five algorithms. The number of data errors of RS-GA, EDiRa and RIGA is less than that of CVD, and accordingly, RS-GA, EDiRa and RIGA have a higher classification accuracy than that of CVD.

FIG. 2 is a classification effect map of the Landsat 8 image obtained by the method disclosed in the present invention. It can be seen from the figure that the texture of the surface feature information in the figure is clear, the boundaries of different types of surface features are obvious, and there are almost no noise spots. The seven categories of regions, i.e., broadleaf, town, conifer, farmland, *Phyllostachys praecox*, water, and moso bamboo, on the image can be effectively identified.

FIG. 3 is a classification effect map of the GF-2 image obtained by the method disclosed in the present invention. The texture of the surface feature information in the figure is clear, and the boundaries of different types of the surface features are very obvious. The five categories of regions, i.e., construction land, bareland, farmland, vegetation, and water, on the image can be effectively identified.

TABLE 14

| Method | Overall accuracy | Kappa coefficient |
|---|---|---|
| RFMD | 0.9687 | 0.9308 |
| RS-GA | 0.9380 | 0.8626 |
| EDiRa | 0.9233 | 0.8310 |
| CVD | 0.9093 | 0.8031 |
| RLGA | 0.9453 | 0.8791 |

TABLE 15

| Method | Overall accuracy | Kappa coefficient |
|---|---|---|
| RFMD | 0.9633 | 0.9190 |
| RS-GA | 0.9247 | 0.8331 |
| EDiRa | 0.9100 | 0.8035 |
| CVD | 0.8960 | 0.7752 |
| RLGA | 0.9387 | 0.8643 |

TABLE 16

| Method | Overall accuracy | Kappa coefficient |
|---|---|---|
| RFMD | 0.9933 | 0.9851 |
| RS-GA | 0.9500 | 0.8872 |
| EDiRa | 0.9100 | 0.8010 |
| CVD | 0.8833 | 0.7494 |
| RLGA | 0.9767 | 0.9479 |

Tables 14, 15 and 16 are classification results of the five algorithms on the first group of methylation data set, the second set of methylation data set, and the banknote verification data set respectively. It can be seen that the classification accuracy of RFMD is the highest among all algorithms. Therefore, the discretization solution obtained by RFMD can achieve good results in terms of the classification accuracy.

The above statements are only preferred embodiments of the present invention and are not intended to limit the present invention. Any modification, equivalent replacement, improvement and the like made within the spirit and principle of the present invention shall be included in the protection scope of the present invention.

The invention claimed is:

1. A remote sensing image feature discretization method based on a rough-fuzzy model, comprising the following steps:

listing a digital number in each band and category of a selected sample in the remote sensing image, and building an image information decision table based on the digital number and category, wherein building the image information decision table based on the digital number and category, comprising:

selecting a plurality of samples from remote sensing images;

obtaining the digital number in each band of each selected sample by image sampling, and labeling a corresponding land cover type in each selected sample, wherein each selected sample constitute a sample set; and building a decision table matrix with each band as a condition attribute and with a corresponding land cover type as a decision attribute according to the sample set with digital number and land cover type label;

initializing a class center of each category and a membership degree of a sample example relative to the class center, wherein initializing the class center of each category and the membership degree of the sample example relative to the class center, comprising:
initializing the class center $$c_j^0$$

of each category as:

$$PM^0 = \begin{bmatrix} f_1(x_1) & f_1(x_2) & \ldots & f_1(x_N) \\ f_2(x_1) & f_2(x_2) & \ldots & f_2(x_N) \\ \cdot & \cdot & \ldots & \cdot \\ \cdot & \cdot & \ldots & \cdot \\ \cdot & \cdot & \ldots & \cdot \\ f_C(x_1) & f_C(x_2) & \ldots & f_C(x_N) \end{bmatrix}$$

$$f_j(x_i) = \begin{cases} 1, & x_i \text{ belongs to class } j \\ 0, & \text{otherwise} \end{cases}$$

where $1 \le i \le N$ and $1 \le j \le C$ wherein N is the number of samples, and C is the number of categories; and
initializing the membership degree of the sample example relative to the class center as:

$$u_{ij}^0 = 1 / \sum_{k=1}^{C} \left( \frac{\sum_{h=1}^{M} \left( x_{ih} - c_{jh} \right)^2}{\sum_{h=1}^{M} = \left( x_{ih} - c_{kh} \right)^2} \right)$$

wherein M is the number of attributes, $x_{ih}$ is a value of the sample $x_i$ on the h the attribute, and cm is a value of the current class center $c_j$ on the h th attribute;
updating the class center of each category and the membership degree of the sample example relative to the class center iteratively, and obtaining a final value of the class center of each category and a final value of the membership degree, wherein updating the class center of each category and the membership degree of the sample example relative to the class center iteratively, comprising:
updating the class center $$c_j^0$$

iteratively by the following formula:

$$c_j^1 = \sum_{j=1}^{N} \left( (u_{ij}^0)^2 \times x_i \right) / \sum_{i=1}^{N} \left( u_{ij}^0 \right)^2$$

wherein $$c_j^1$$

is an updated class center; and computing the new membership degree $$u_{ij}^1$$

iteratively according to the updated class center $$c_j^1;$$

building a rough-fuzzy set, computing a mean approximation accuracy of the rough-fuzzy set, discretizing the image information decision table, evaluating discretization results based on the mean approximation accuracy and a genetic algorithm, and selecting an optimal discretization solution, wherein building the rough-fuzzy set, and computing the mean approximation accuracy of the rough-fuzzy set, comprising:
creating the rough-fuzzy set based on each category:

$$A_j(x_i) = u_{ij}, 1 \le i \le N, 1 \le j \le C;$$

computing a lower approximation of the rough-fuzzy set:

$$R\_A_j(x_i) = \inf_{y \in U} \{A_j(y) \mid (x_i, y) \in R\};$$

computing an upper approximation of the rough-fuzzy set:

$$R^- A_j(x_i) = \sup_{y \in U} \{A_j(y) \mid (x_i, y) \in R\};$$

computing the mean approximation accuracy of the rough-fuzzy set:

$$\overline{\eta} = \frac{1}{C} \sum_{j=1}^{C} \frac{|R\_A_j|}{|R^- A_j|}; \text{ and}$$

stopping iterative computations of $u_{ij}$ and $c_j$, and obtaining the final value of the class center of each category and the final value of the membership degree when the following conditions are met:

$$\max_{ij} \left\{ \left| u_{ij}^{t+1} - u_{ij}^{t} \right| \right\} < \varepsilon$$

wherein t is the number of iterations, & is an error threshold.
2. The method according to claim 1, characterized by discretizing the image information decision table, comprising:
sorting and deduplicating in each band, according to brightness values, all digital numbers contained in each band in the image information decision table, and obtaining initial breakpoints of all bands, wherein the initial breakpoints constitute a candidate breakpoint set of the remote sensing images, and each subset of the candidate breakpoint set corresponds to a discretization solution of the remote sensing images.
3. The method according to claim 2, characterized by evaluating the discretization results based on the mean approximation accuracy and the genetic algorithm, and selecting the optimal discretization solution, comprising:

building a fitness function based on the mean approximation accuracy and initial breakpoints constitute a candidate breakpoint set:

$$Fit = \alpha \times |D| + \beta \times \overline{\eta}$$

where $\alpha \geq 0$, $\beta \geq 0$, and $\alpha + \beta = 1$ wherein $|D|$ is the number of breakpoints of the discretization solution D, and both $\alpha$ and $\beta$ are weight coefficients; and taking a discretization solution as an individual of a group in the genetic algorithm, computing the fitness values of all the individuals in the group iteratively based on the fitness function, and finding an individual with the greatest fitness value, wherein the discretization solution corresponding to the individual with the greatest fitness value is the optimal discretization solution.

* * * * *